US009238997B2

(12) United States Patent
Gerum et al.

(10) Patent No.: US 9,238,997 B2
(45) Date of Patent: Jan. 19, 2016

(54) EXHAUST GAS TURBOCHARGER FOR AN INTERNAL COMBUSTION ENGINE HAVING A FRESH GAS SUPPLY DEVICE AND A CORRESPONDING ARRANGEMENT

(75) Inventors: Eduard Gerum, Rosenheim (DE); Manuel Marx, Weichs (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/532,433

(22) Filed: Jun. 25, 2012

(65) Prior Publication Data

US 2012/0317976 A1    Dec. 20, 2012

Related U.S. Application Data

(63) Continuation of application No. PCT/EP2010/069824, filed on Dec. 15, 2010.

(30) Foreign Application Priority Data

Dec. 23, 2009   (DE) .......................... 10 2009 060 181

(51) Int. Cl.
*F02B 33/44* (2006.01)
*F02D 23/00* (2006.01)
*F02B 37/10* (2006.01)
*F02B 37/14* (2006.01)

(52) U.S. Cl.
CPC ................. *F02B 37/10* (2013.01); *F02B 37/14* (2013.01); *Y02T 10/144* (2013.01)

(58) Field of Classification Search
CPC .......... F02B 37/10; F02B 37/14; F02B 37/00; F02D 41/00007; Y02T 10/144
USPC ................................ 60/605.1, 607, 608, 611
See application file for complete search history.

(56) References Cited

U.S. PATENT DOCUMENTS 4,145,888 A * 3/1979 Roberts ........................... 60/608
4,312,183 A * 1/1982 Regar .............................. 60/608
(Continued)

FOREIGN PATENT DOCUMENTS

DE           25 14 699 A1      10/1976
DE           29 12 950 A1      10/1980
(Continued)

OTHER PUBLICATIONS

German Office Action dated Dec. 28, 2010 including English-language translation (Eight (8) pages).
(Continued)

*Primary Examiner* — Thai Ba Trieu
*Assistant Examiner* — Ngoc T Nguyen
(74) *Attorney, Agent, or Firm* — Crowell & Moring LLP

(57) ABSTRACT

An exhaust gas turbocharger for an internal combustion machine, in particular a diesel engine, having an unburnt mixture supply device, includes at least one compressor; at least one exhaust gas turbine; a turbocharger shaft by which the compressor and the exhaust gas turbine are rotationally fixedly coupled; and an energy store for increasing a mass moment of inertia. The energy store is rotationally fixedly coupled to the at least one compressor and the at least one exhaust gas turbine by the turbocharger shaft. An arrangement for supplying unburnt gas to an internal combustion machine includes such an exhaust gas turbocharger and an unburnt gas supply device.

6 Claims, 3 Drawing Sheets

(56) References Cited

U.S. PATENT DOCUMENTS

| | | | |
|---|---|---|---|
| 5,076,059 A * | 12/1991 | Okada | 60/608 |
| 6,553,764 B1 * | 4/2003 | Gladden et al. | 60/608 |
| 6,718,768 B2 | 4/2004 | Shaffer | |
| 7,665,302 B2 | 2/2010 | Nemeth et al. | |
| 8,434,305 B2 * | 5/2013 | Donkin et al. | 60/611 |
| 2004/0025506 A1 | 2/2004 | Shaffer | |
| 2007/0101714 A1 | 5/2007 | Duesmann et al. | |
| 2008/0066467 A1 * | 3/2008 | Nemeth et al. | 60/611 |
| 2009/0000298 A1 * | 1/2009 | Barthelet | 60/608 |
| 2011/0045949 A1 | 2/2011 | Nemeth et al. | |
| 2011/0288715 A1 * | 11/2011 | Schaffeld et al. | 701/103 |
| 2012/0297769 A1 * | 11/2012 | Gerum | 60/611 |

FOREIGN PATENT DOCUMENTS

| | | | | |
|---|---|---|---|---|
| DE | 28 34 785 C2 | 7/1986 | | |
| DE | 36 02 543 A1 | 10/1987 | | |
| DE | 10 2004 026 796 A1 | 12/2005 | | |
| DE | 10 2008 000 325 A1 | 8/2009 | | |
| EP | 0354054 B1 * | 4/1994 | | F02B 37/12 |
| JP | 57-143127 A | 9/1982 | | |
| JP | 58-5426 A | 1/1983 | | |
| JP | 2008-531907 A | 8/2008 | | |
| JP | 2009-281195 A | 12/2009 | | |
| WO | WO 2005/119027 A1 | 12/2005 | | |
| WO | WO 2006/089779 A1 | 8/2006 | | |
| WO | WO 2009/106275 A2 | 9/2009 | | |
| WO | WO 2011146504 A1 * | 11/2011 | | F02B 21/00 |

OTHER PUBLICATIONS

International Search Report dated May 3, 2011 including English-language translation (Six (6) pages).

International Preliminary Report on Patentability and Written Opinion of the International Searching Authority including English translation dated Jul. 19, 2012 (fourteen (14) pages).

German-Language Japanese Office Action dated Sep. 22, 2014 (six (6) pages).

* cited by examiner

EXHAUST GAS TURBOCHARGER FOR AN INTERNAL COMBUSTION ENGINE HAVING A FRESH GAS SUPPLY DEVICE AND A CORRESPONDING ARRANGEMENT

CROSS-REFERENCE TO RELATED APPLICATIONS

This application is a continuation of PCT International Application No. PCT/EP2010/069824, filed Dec. 15, 2010, which claims priority under 35 U.S.C. §119 from German Patent Application No. DE 10 2009 060 181.3, filed Dec. 23, 2009, the entire disclosures of which are herein expressly incorporated by reference.

BACKGROUND AND SUMMARY OF THE INVENTION

The invention relates to an exhaust gas turbocharger for an internal combustion engine having a fresh gas supply device. The invention also relates to a corresponding arrangement for supplying fresh gas to an internal combustion engine.

Internal combustion engines, e.g. diesel engines, are often fitted with exhaust gas turbochargers. FIG. 1 shows a prior-art internal combustion engine 1, the exhaust gas line 6 of which is connected to an exhaust gas turbine 12 of an exhaust gas turbocharger 10. This exhaust gas turbine 12 drives a compressor 11 of the exhaust gas turbocharger 10, with the exhaust gas turbine 12 and the compressor 11 here being coupled by a turbocharger shaft 13. The compressor 11 compresses intake air from a fresh gas inlet 2 and thus increases an intake pressure in an intake line 5 of the internal combustion engine 1. An acceleration behavior, for example, of a vehicle (not shown) fitted with the internal combustion engine 1 is thereby improved. Moreover, a reduction in fuel consumption is achieved.

Compressor rotors of exhaust gas turbochargers in internal combustion engines are produced from aluminum or aluminum alloys or from titanium or titanium alloys. The reason for this is their low density and hence their low mass moment of inertia. This favors rapid acceleration of the turbocharger and hence reduces "turbo lag". This turbo lag arises in internal combustion engines with exhaust gas turbochargers because, during an acceleration process, the exhaust gas mass flow from the internal combustion engine 1 through the exhaust gas turbine 12 must accelerate the compressor 11 of the exhaust gas turbocharger 10 to enable it to build up its full boost pressure. The time before the maximum boost pressure is reached depends decisively on the inertia of the rotors (of the exhaust gas turbine 12 and of the compressor 11). The lower the mass moment of inertia, the greater is the reduction in the turbocharger speed during a shift operation or gear change (especially in the case of manual transmissions and automated shift transmissions). The result is that, after clutch engagement, the exhaust gas turbocharger 10 must first of all be reaccelerated to the required speed, which corresponds to the engine speed at that time.

Solutions have been proposed to enable this turbo lag to be overcome, wherein compressed air sourced, for example, from a compressed air reservoir 8 fed by an air compressor 9 is introduced in a controlled manner into the intake line 5 of the internal combustion engine 1 in order to cover an increased intake air requirement of the internal combustion engine 1 when this occurs. This is accomplished by use of a fresh gas (unburnt gas) supply device 4, which is arranged between the compressor 11 of the turbocharger 10, or a charge air cooler 3 fitted downstream in the direction of flow, and the intake line 5.

WO 2006/089779 A1 describes a device for supplying fresh air to a turbocharged piston-type internal combustion engine and a method for operating the same.

It is therefore the object of the present invention to provide an improved exhaust gas turbocharger.

This and other objects are achieved by an exhaust gas turbocharger having for an internal combustion engine, in particular a diesel engine, having a fresh gas supply device. The exhaust gas turbocharger comprises wherein the exhaust gas turbocharger comprises at least one compressor; at least one exhaust gas turbine; a turbocharger shaft, by which the at least one compressor and the at least one exhaust gas turbine are coupled for conjoint rotation; and an energy storage device for increasing a mass moment of inertia, wherein the energy storage device is coupled to the at least one compressor and the at least one exhaust gas turbine for conjoint rotation by way of the turbocharger shaft.

One aspect of the invention consists in fitting the exhaust gas turbocharger with an energy storage device, which increases a mass moment of inertia of the exhaust gas turbocharger.

In contrast to the fact that an increase in the inertia of the exhaust gas turbocharger, i.e. of the rotating components, leads to a significant increase in "turbo lag", a combination in an arrangement of an exhaust gas turbocharger and a fresh gas supply device has the advantage that the exhaust gas turbocharger is synchronized with the existing engine speed after a gear change to such an extent that there is no need to accelerate the exhaust gas turbocharger to a turbocharger speed required for the existing engine speed in order to obtain an associated boost pressure.

Another advantage is that the compressed air consumption of the fresh gas supply device is reduced since acceleration of the exhaust gas turbocharger after a gear change is eliminated.

For this purpose, the energy storage device has a rotating mass. It can be designed as a kind of flywheel mounted on the turbocharger shaft for conjoint rotation. This rotating mass can also be at least partially integrated into the turbocharger shaft, thereby reducing the number of parts.

The rotating mass of the energy storage device may be distributed in such a way that it is integrated at least partially into rotating parts of the at least one compressor and/or of the at least one exhaust gas turbine. This is possible, for example, if the rotors of the compressor and/or the exhaust gas turbine are produced from steel.

In a preferred embodiment, the rotating mass of the energy storage device can be specified for a predetermined retardation of the speed of the exhaust gas turbocharger, thereby reducing the compressed air consumption of the fresh gas supply device. At the same time, the efficiency of the internal combustion engine is increased.

Moreover, a reduction in compressed air consumption avoids adaptation of an air compressor of the compressed air system for the additional air or of an air drying system since, by virtue of the energy storage device, there is no extra increase in the requirement for additional air that would necessitate adaptation.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components and functional units with an identical function are denoted by identical reference signs in the figures.

Figure 1:
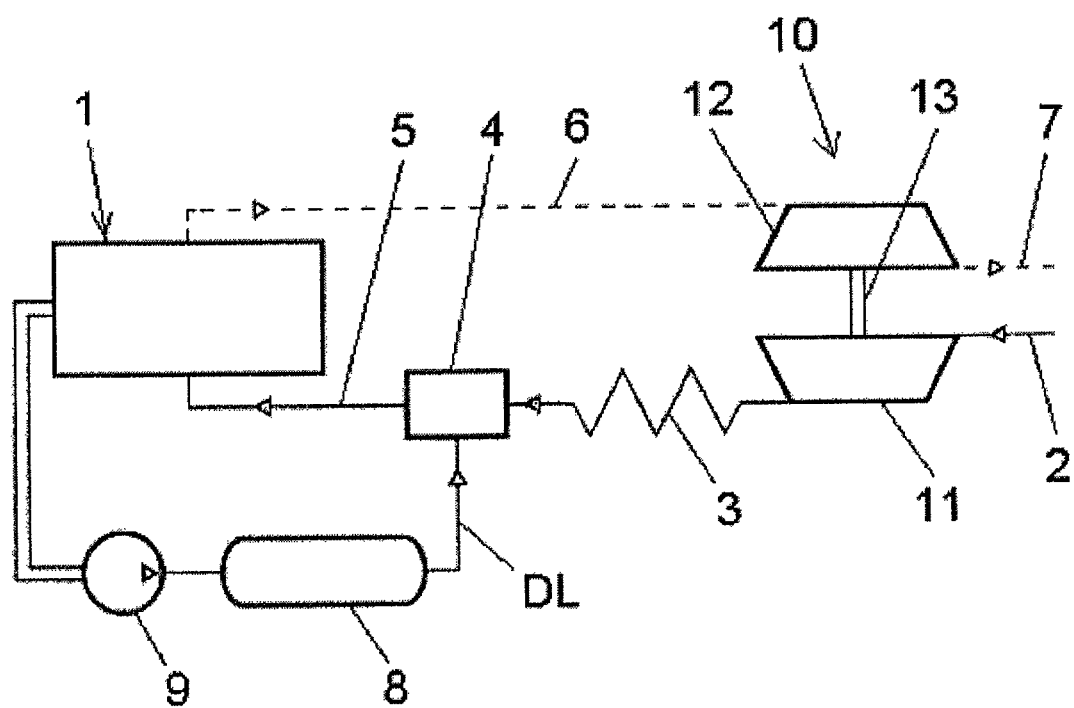
FIG. 1 is a schematic representation of an internal combustion engine with an exhaust gas turbocharger and a fresh gas supply device in accordance with the prior art.

FIG. 1 is described above and is not explained further.

Figure 2:
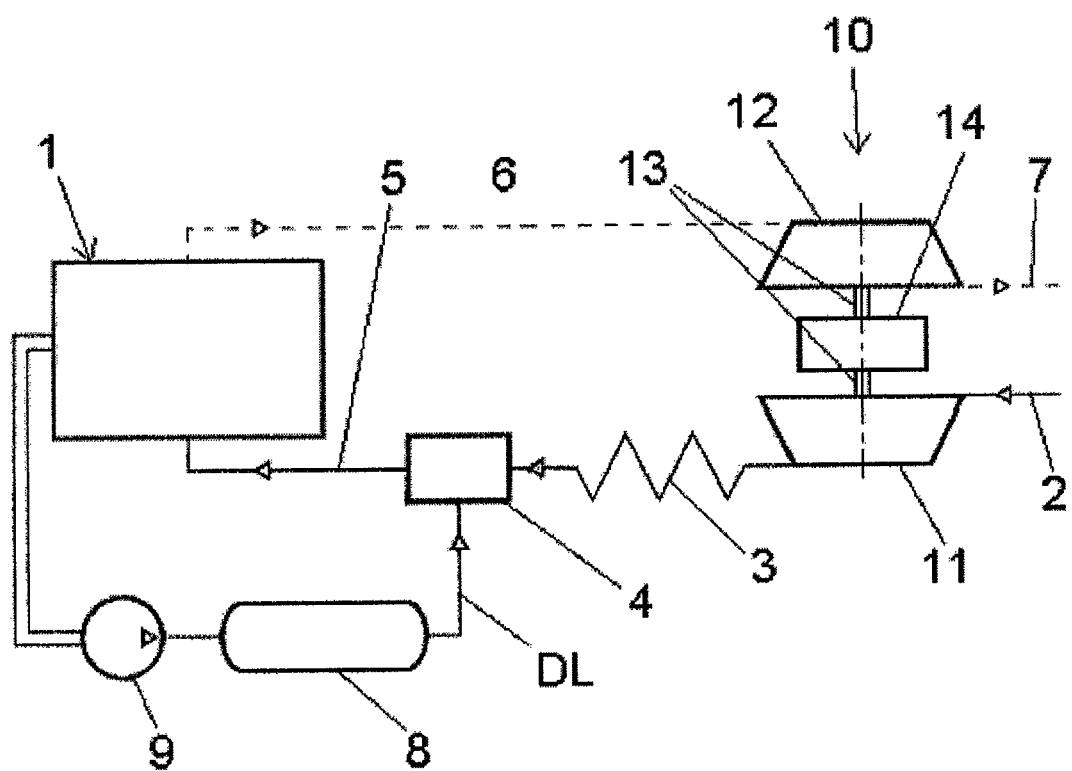
FIG. 2 is a schematic representation of an internal combustion engine with an illustrative embodiment of an exhaust gas turbocharger according to the invention and a fresh gas supply device.

FIG. 2 shows a schematic representation of an internal combustion engine 1 having an illustrative embodiment of an exhaust gas turbocharger 10 according to the invention and a fresh gas supply device 4. In contrast to the illustration in FIG. 1, the exhaust gas turbocharger 10 in the illustrative embodiment shown in FIG. 2 has an energy storage device 14. The exhaust gas turbocharger 10 and the fresh gas supply device 4 form an arrangement for supplying fresh gas to the internal combustion engine 1.

The energy storage device 14 is coupled to the turbocharger shaft 13 and, in this example, includes a rotating mass, which rotates together with the compressor 11 and the exhaust gas turbine 12 when the exhaust gas turbine 12 is driven by the exhaust gas flow from the internal combustion engine 1.

During this process, the energy storage device as a rotating mass in the form of a flywheel increases the inertia of the compressor 11 and the exhaust gas turbine 12. However, an increase in this inertia due to the rotating mass leads to a significant increase in turbo lag during acceleration processes and when starting the vehicle associated with the internal combustion engine 1 or during acceleration from a low engine speed without a shift operation.

However, in the combination, illustrated in FIG. 2, of the exhaust gas turbocharger 10, which is provided with the energy storage device 14, with the fresh gas supply device 4, the turbo lag, which is increased by the increased inertia of the rotors of the compressor 11 and the exhaust gas turbine 12, is also almost completely eliminated by introducing compressed air into the intake line 5 of the internal combustion engine 1 by way of the fresh gas supply device 4.

The energy storage device 14 can be mounted for conjoint rotation as a rotating mass on the turbocharger shaft 13. It is also possible for the rotating mass to be distributed between two or more flywheels, for example, these being arranged at suitable positions on the turbocharger shaft 13. The energy storage device 14 can also be coupled to the turbocharger shaft 13 in some other ways, e.g. by use of a clutch and/or a gear mechanism. Of course, the turbocharger shaft 13 can also be designed in such a way that the energy storage device is integrated therein.

The rotating mass of the energy storage device 14 can be chosen in such a way that a drop in the speed of the exhaust gas turbocharger, during a gear change for example, reaches a predetermined value per unit time. In this way, it is possible, especially (but not exclusively) in the case of automated shift transmissions, to synchronize the turbocharger speed after a shift operation or gear change with the then existing engine speed. An unnecessary acceleration of the exhaust gas turbocharger 10 is thereby avoided or minimized.

Figure 3A:
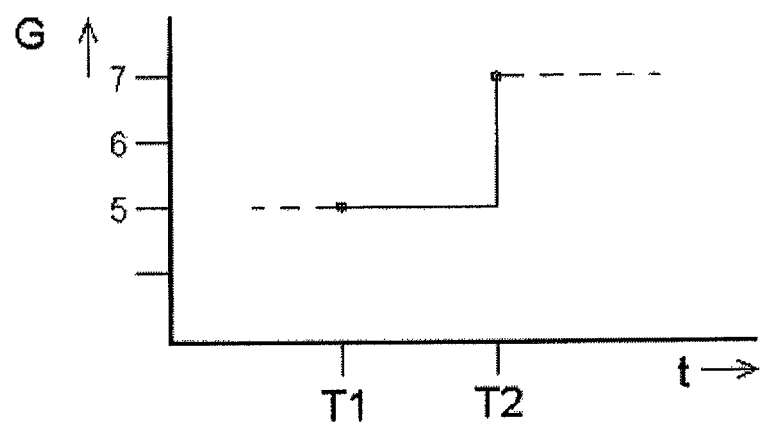
FIGS. 3a-c are three diagrams of relationships of a gear-stage change with the engine speed and the turbocharger speed with respect to time.
Figure 3B:
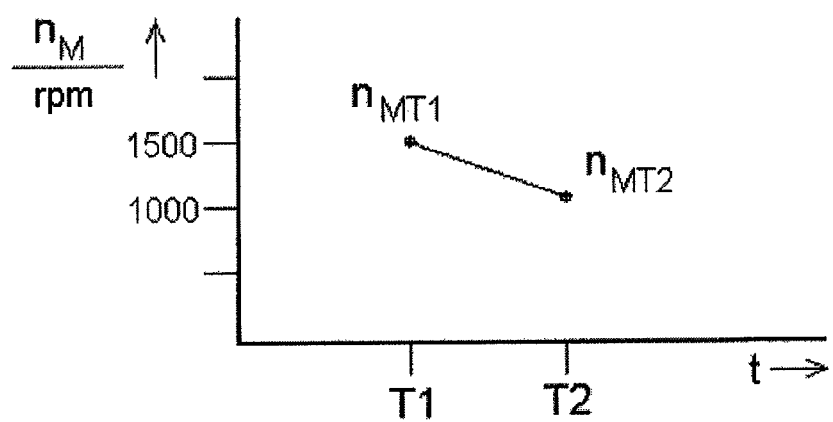
Figure 3C:
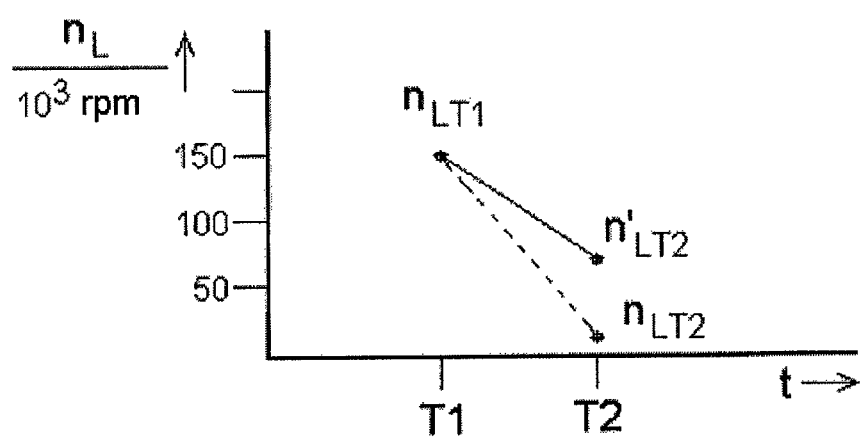

This will be explained by means of an example in conjunction with FIGS. 3a-c. FIGS. 3a-c show three diagrams of relationships of a gear stage change G with an engine speed $n_M$ and a turbocharger speed $n_L$ with respect to time.

FIG. 3a is a diagram of gear stages G against time t. In this example, a gear stage 5 of an automated shift transmission (not shown) has been set before a time T1. At time T1, there is a gear stage change from gear stage 5 to gear stage 7. At time T2, gear stage 7 has been adopted.

The duration of the gear stage change or shift operation between T1 and T2 is 2 seconds in this example.

Coinciding with FIG. 3a with respect to time, FIG. 3b shows a diagram in which an engine speed $n_M$ is plotted schematically against time as a graph segment. At time T1, the engine speed $n_{MT1}$ is 1500 rpm. When the clutch is disengaged for the gear change, the engine speed $n_M$ decreases until, when the clutch is engaged at time T2, it is at a value of $n_{MT2}$=1150 rpm.

FIG. 3c shows the associated turbocharger speed $n_L$ in another diagram. At time T1, the turbocharger speed $n_{LT1}$ is 150000 rpm. The case of a conventional turbocharger will be described first. In this case, the turbocharger speed $n_L$ falls during the shift operation to $n_{LT2}$=20000 rpm at time T2, owing to a decreasing exhaust gas flow. This is indicated by the broken straight line. In order to achieve a boost pressure required for the engine speed $n_{MT2}$=1150 rpm existing at time T2, the turbocharger would have to have an optimum turbocharger speed of $n'_L$=70000 rpm. Since this is not the case here, the turbocharger must be accelerated from 20000 rpm to 70000 rpm.

When the turbocharger 10 with the energy storage device 14 is used, the turbocharger speed $n_L$ falls to a value of "only" $n'_{LT2}$=70000 rpm at time T2, owing to the increased inertia.

Here, the rotating mass is predetermined in such a way that the exhaust gas turbocharger 10 is slowed by 40000 rpm/s during the shift operation lasting for 2 s. In this way, the optimum turbocharger speed $n'_{T2}$ is obtained at time T2 after a shift operation lasting for 2 s, and this is now synchronized with the existing engine speed $n_{MT2}$. There is then no longer any need for any unnecessary acceleration of the exhaust gas turbocharger 10, and turbo lag no longer occurs.

Of course, the rotating mass of the energy storage device 14 increases turbo lag when starting from an idling speed of the internal combustion engine 1 or when accelerating from a low engine speed $n_M$ without a shift operation. However, this effect is completely eliminated by the fresh gas supply device 4.

Since, when time T2 is reached, i.e. after the shift operation has been carried out, the turbocharger speed $n_{LT2}$ is synchronized with the engine speed $n_{MT2}$ and there is no longer any need for acceleration, air consumption during the process of introducing compressed air by way of the fresh gas supply device is reduced. As a result, a required adaptation of the air compressor 9 or of an air drying system, e.g. in a commercial vehicle, can be avoided and a cost saving is obtained.

The illustrative embodiment described above does not restrict the invention. It can be modified within the scope of the attached claims. For example, it is contemplated for the energy storage device 14 to be retrofitted to exhaust gas turbochargers 10 prepared for that purpose, e.g. by way of a corresponding clutch, or for it to be mounted therein.

In the turbocharger 10, the rotors of the compressor 11 and/or of the exhaust gas turbine 12 can be composed of a heavier material than aluminum or titanium, such as steel. It is thereby possible to reduce the additional rotating mass of the energy storage device 14.

It is also contemplated for the energy storage device 14 to be completely distributed or distributed between two or more sections and to be coupled by one or more controllable clutches to the exhaust gas turbocharger shaft 13 in order to adapt the mass moment of inertia to different operating states of the internal combustion engine 1.

LIST OF REFERENCE NUMERALS

1 internal combustion engine
2 fresh gas inlet
3 charge air cooler
4 fresh gas supply device
5 intake line
6 exhaust gas line
7 exhaust gas outlet
8 compressed air reservoir
9 air compressor
10 exhaust gas turbocharger
11 compressor
12 exhaust gas turbine
13 turbocharger shaft
14 energy storage device
DL compressed air line
G gear stage
$n_M$ engine speed
$n_L$ turbocharger speed
t, T1, T2 time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas turbocharger-equipped internal combustion engine, comprising:
    an engine having an intake and an exhaust and being configured to drive a vehicle transmission;
    a fresh gas supply device configured to introduce stored compressed fresh gas from a storage tank into the engine intake; and
    an exhaust gas turbocharger arranged to receive exhaust gas from the engine exhaust and deliver fresh gas from the atmosphere to the engine intake,
    wherein
        the fresh gas supply device is configured to introduce the stored compressed fresh gas into the engine intake between the exhaust gas turbocharger and the engine such that additional exhaust gas flow is generated to increase a rotation speed of the exhaust gas turbocharger to eliminate turbo lag due to at least one of starting the internal combustion engine from idling speed and accelerating the internal combustion engine from a low speed without a shift operation, and
    the exhaust gas turbocharger includes
        at least one compressor,
        at least one exhaust gas turbine,
        a turbocharger shaft, by which the at least one compressor and the at least one exhaust gas turbine are coupled for conjoint rotation,
        a rotational energy storage device having a mass moment of inertia, the rotational energy storage device being integral with or non-disengageably connected to at least one of the turbocharger shaft, the at least one compressor and the at least one exhaust gas turbine for conjoint rotation to increase a mass moment of inertia of the combined turbocharger shaft, turbine and compressor, wherein
            the mass moment of inertia of the rotational energy storage device is selected to obtain a predetermined turbocharger deceleration rate during shifting of the transmission, and
            the predetermined deceleration rate is selected such that the turbocharger speed before the transmission shift decreases during the transmission shift to a speed after the transmission shift that does not need to be increased to provide positive pressure in the engine intake downstream of the turbocharger compressor.

2. The exhaust gas turbocharger as claimed in claim 1, wherein a rotating mass of the energy storage device is integrated at least partially into the turbocharger shaft.

3. The exhaust gas turbocharger as claimed in claim 2, wherein the exhaust gas turbocharger is for a diesel engine.

4. The exhaust gas turbocharger as claimed in claim 1, wherein a rotating mass of the energy storage device is integrated at least partially into rotating parts of at least one of the at least one compressor and the at least one exhaust gas turbine.

5. The exhaust gas turbocharger as claimed in claim 4, wherein the exhaust gas turbocharger is for a diesel engine.

6. The exhaust gas turbocharger as claimed in claim 1, wherein the exhaust gas turbocharger is for a diesel engine.

\* \* \* \* \*